(12) United States Patent
Hickson

(10) Patent No.: US 6,678,802 B2
(45) Date of Patent: Jan. 13, 2004

(54) METHOD AND APPARATUS FOR CONTROLLING ACCESS BY A PLURALITY OF CONCURRENTLY OPERATING PROCESSES TO A RESOURCE

(75) Inventor: Andrew Ian Hickson, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 09/900,227

(22) Filed: Jul. 6, 2001

(65) Prior Publication Data

US 2002/0120819 A1 Aug. 29, 2002

(30) Foreign Application Priority Data

Feb. 24, 2001 (GB) ................................................ 0104764

(51) Int. Cl.[7] .............................................. G06F 13/00
(52) U.S. Cl. ...................... 711/152; 711/151; 711/158; 711/168
(58) Field of Search .......................... 71/151, 152, 158, 71/168

(56) References Cited

U.S. PATENT DOCUMENTS

| | | | | | |
|---|---|---|---|---|---|
| 5,088,036 | A | * | 2/1992 | Ellis et al. | ................... 707/206 |
| 5,761,670 | A | * | 6/1998 | Joy | ......................... 707/103 R |
| 5,953,530 | A | * | 9/1999 | Rishi et al. | .................. 717/127 |
| 6,353,829 | B1 | * | 3/2002 | Koblenz et al. | ............ 707/100 |

\* cited by examiner

*Primary Examiner*—Reba I. Elmore
(74) *Attorney, Agent, or Firm*—Ohlandt, Greeley, Ruggiero & Perle, L.L.P.

(57) ABSTRACT

The invention relates to controlling access by a plurality of concurrently operating processes to a resource. An area of storage is allocated and a pre-determined number of slots defined therein. Responsive to a request by one of the processes for shared access to the resource, a determination is made as to whether to allocate shared access, and if so, the requesting process is allocated shared access upon the acquisition of one of the storage slots. Responsive to a request by one of the processes for exclusive access to the resource, a determination is made as to whether to allocate exclusive access, and if so exclusive access is allocated upon the acquisition of all of the storage slots.

51 Claims, 5 Drawing Sheets

METHOD AND APPARATUS FOR CONTROLLING ACCESS BY A PLURALITY OF CONCURRENTLY OPERATING PROCESSES TO A RESOURCE

FIELD OF THE INVENTION

The present invention relates to data processing systems, and more particularly to controlling access to resources available to such systems.

BACKGROUND OF THE INVENTION

Multiprocessing computer systems are commonplace. Where more than one process operates concurrently and has access to the same piece of shared data or resource, it is important that access restrictions are employed to ensure the integrity of that data. It is essential that valid data is always read and that updates to the data are correctly recorded. Without careful control, this could quite easily not be the case. If, for example, a process A is reading a bank account total in order to perform some arbitrary calculation, at the same time that a process B is updating the account total, then the calculation will most likely be performed using the old total and will therefore be incorrect. This is simply not acceptable.

It is common, therefore, to use locks to control access to a shared resource. A lock is typically allocated in either shared or exclusive mode. A process, in possession of a shared lock (e.g. a reader), may access the resource for which it holds the lock, alongside other processes also in possession of the shared lock. In other words, multiple readers may access the resource concurrently. When however a writing process (a writer) wishes to access the same resource, no other process must be accessing the data. The writer must therefore obtain an exclusive lock on the resource.

Shared/exclusive locks are frequently implemented using a simple count of the number of readers. The count is increased every time a new reader accesses the shared resource, and decremented when the reader relinquishes access. A writer may only access the resource when the reader count is at zero. This is because it is important that reading processes always view the most up-to-date information.

This method however, presents a number of problems. If one of the readers terminates abnormally, then it can be very difficult to adjust the count. If the count is not decremented properly then this can result in a writer waiting indefinitely for a process that is no longer accessing the resource.

Another problem relates to prioritising access to the resource. For example, if a resource already has one or more readers, should a writer or another reader be granted access when the current owner relinquishes access? With the above method, the choice depends upon whichever process gets there first. This can mean, for example, that a high priority writer is waiting unnecessarily on a low priority reader.

Both the above problems stem from the fact that insufficient information can be recorded about the readers. The dynamic nature of the number of readers, means that recording information is tricky. This method is therefore inefficient and lacks recoverability.

An alternative is to maintain a list of readers in a complex chain (linked list) structure. This solution can record appropriate information about each reader (such as a thread id and priority information) and is also recoverable. If, for example, a writer has been waiting for an exclusive lock on a resource for an excessively long a period of time, then the reader list can be traversed in order to check that the thread ids listed are still actively accessing the resource.

Unfortunately there is a significant performance overhead associated with the upkeep of such a structure. The number of readers in the list varies dynamically and thus storage allocation can become a problem. Further, it is necessary to lock the whole or a part of the structure before making a change to it. Deleting a reader also typically requires additional serialisation.

SUMMARY OF THE INVENTION

Accordingly, the invention provides a method for controlling access by a plurality of concurrently operating processes to a resource, said method comprising the steps of: allocating an area of storage and defining a pre-determined number of storage slots therein; responsive to a request by one of said processes for shared access to said resource, determining whether to allocate shared access, and if so, allocating said requesting process shared access, said step of allocating shared access comprising: acquiring one of said storage slots; and wherein said method further comprises: responsive to a request by one of said processes for exclusive access to said resource, determining whether to allocate exclusive access, and if so allocating said requesting process exclusive access, said step of allocating exclusive access comprising: acquiring all of said storage slots.

It should also be noted that although the terms multiprocessing system and process are used throughout, this should also be taken to encompass threads which may run under the control of a process. Threads within one process may compete for access to a resource with threads from another process. However, threads within the same process may also compete for access to a resource. The invention is preferably aimed at controlling access to a resource in both such situations.

According to one embodiment, the step of determining whether shared access is to be allocated comprises selecting a storage slot and determining whether that storage slot is owned by another process (i.e. has been acquired by another process). Responsive to the slot not being owned by another process, the selected storage slot is acquired.

Alternatively, the step of determining whether shared access is to be allocated, comprises checking whether any one of a set of storage slots is unallocated and assuming that one is, an unallocated slot is acquired and shared access is allocated. The set of storage slots may comprise a part of the storage area, the whole storage area (i.e. slots 0 to n) or indeed, more than one pass of the storage area may be completed (e.g. 2n).

According to one embodiment, each process has at least one thread having a unique thread id. Each thread id is preferably unique not only within a process, but across all processes having access to the resource. A process indicates ownership of a storage slot by associating the thread id of the thread requesting access to the resource with the storage slot. (Ownership of a storage slot is exclusive and may not therefore be shared with another process.) A process also has priority information associated therewith.

In one embodiment, this priority information is used when allocating a process with shared access. Responsive to determining that a first storage slot is owned by another process, an action is performed based on the priority of the requesting process. If the requesting process has a low priority then the requesting process waits for the selected storage slot to be relinquished by the owning process and acquires the selected slot once this has occurred. If the requesting process has a high priority then storage slots continue to be selected until an unallocated storage slot is found and this unallocated slot is then acquired. Preferably no more than a predetermined number of storage slots are selected, and responsive to none of said selected storage slots being available, the requesting process waits for the last of the selected slots to be relinquished by an owning process. Once this last slot has been relinquished it is then acquired by the process requesting shared access.

According to one embodiment, an input queue is associated with at least one of the storage slots. When allocating shared access to the resource, if processes are queued on a selected storage slot, another storage slot is selected (e.g. either an unallocated slot or one without an associated queue). According to one embodiment, processes are queued according to their priority information. This may be used, for example, to move a high priority process to the head of a queue. This requires careful control to ensure that low priority requests do not wait indefinitely for access to the resource.

According to one embodiment, a process requesting shared access and having a low priority selects a storage slot from a first part of the storage area, whilst a process having a high priority selects a storage slot from a second part of the storage area. This ensures that low priority requests are pitted against one another and likewise with the high priority requests. A high priority request should not therefore, be forced to wait on a low priority request.

According to one embodiment, if none of the storage slots are available in the second part of the storage area, an unallocated storage slot is acquired in the first part of the storage area. Preferably this is not a regular occurrence since otherwise it is likely that low priority requests will have trouble gaining access to the resource.

According to one embodiment, in order to acquire all of the storage slots (i.e. to allocate exclusive access) each storage slot is selected. Responsive to a selected storage slot not being owned by another process, that storage slot is acquired. Responsive to a selected storage slot being owned by another process, the process requesting exclusive access waits until the storage slot is relinquished and then acquires the relinquished slot. Note, the storage slots may be selected sequentially or in some other order. Further this method of acquiring all of the storage slots may be used, for example, by a low priority process.

Alternatively, in order to acquire all of the storage slots (i.e. to allocate exclusive access), each storage slot not owned by another process (i.e. unallocated) is acquired on at least a first pass of the storage area. Subsequently each remaining slot (if there are any) is waited upon until it is relinquished and then that relinquished slot is acquired. Note, this method of acquiring all of the storage slots may be used, for example, by a high priority process.

In another embodiment, a process requesting exclusive access is informed as and when each allocated slot is relinquished and responsive to a slot being relinquished, the process acquires the relinquished slot. This continues until all slots have been acquired by the requesting process. In one embodiment there is a queue of processes requesting exclusive access and a process is only removed from the queue once it has acquired all slots in the storage area and thus access to the resource.

In one embodiment, each time a process requesting shared access acquires a storage slot, the position of that storage slot is recorded. Responsive to that process no longer requiring shared access to the resource, the slot denoting said process' shared access is relinquished using said recorded position to locate the storage slot.

In another embodiment, a storage slot is selected and it is determined whether a thread id associated with a thread requesting that said shared access be relinquished matches a thread id associated with the selected storage slot. Responsive to a match, the selected storage slot is relinquished. Otherwise storage slots are selected until a match is achieved. Selection of storage slots may be sequential or otherwise.

In one embodiment one of a first part and a second part of the storage area are searched for the storage slot denoting said process' shared access. For example, if the first part of the storage array is used by low priority requests and the second part by high priority requests, then a high priority request attempting to relinquish a storage slot will only search the second part of the storage area, and vice versa.

In one embodiment, responsive to a process no longer requiring exclusive access to the resource, access to all of said storage slots is relinquished.

According to another aspect, the invention provides a computer program product comprising computer program code recorded on a computer readable recording medium, which when executed on a computer, performs the method described above.

In a further aspect, the invention provides an apparatus having a storage, for controlling access by a plurality of concurrently operating processes to a resource, said apparatus comprising: means for defining a predetermined number of slots within said storage; means, responsive to a request by one of said processes for shared access to said resource, for determining whether to allocate shared access; and means, responsive to a determination that shared access is to be allocated, for allocating said requesting process shared access, said means for allocating shared access comprising: means for acquiring one of said storage slots; and wherein said apparatus further comprises: means, responsive to a request by one of said processes for exclusive access to said resource, for determining whether to allocate exclusive access; and means, responsive to a determination that exclusive access is to be allocated, for allocating said requesting process exclusive access, said means for allocating exclusive access comprising: means for acquiring all of said storage slots.

Whilst the present inventions does limit number of concurrent readers that are permitted to access a resource, it is beneficial to have this upper limit. This is because it is possible to accurately record information about the process (es) accessing a resource. Storage space can be pre-allocated and there is little overhead associated with managing the storage area.

The size of the storage area is preferably determined in accordance with the requirements of the system in which the invention is implemented. In other words, the storage area is preferably large enough to accommodate the typical number of processes concurrently requiring shared access to the resource. According to one embodiment the size of this area may be updated if the system's requirements change or if the current setup is found not to be as efficient as first thought.

BRIEF DESCRIPTION OF THE DRAWINGS

Embodiments of the present invention will now be described, by way of example only, and with reference to the following drawings.

DESCRIPTION OF THE PREFERRED EMBODIMENTS

The need for locking arises in a variety of different types of system. To reiterate, it is necessary in any system in which multiple processes access a resource. This is immaterial as to whether these processes and the resource all reside on one machine or are spread out across a network of machines.

Such systems can include database management systems and transaction processing systems. A message queuing system (e.g. IBM's MQSeries[(R)] message queuing product) provides another example. In this example communication between programs (or processes) is by means of queues onto which the programs put messages or from which programs get messages. Management of these queues is under control of a queue manager. A queue is therefore a shared resource which is accessible by both the queue manager and at least one client process.

Figure 1:
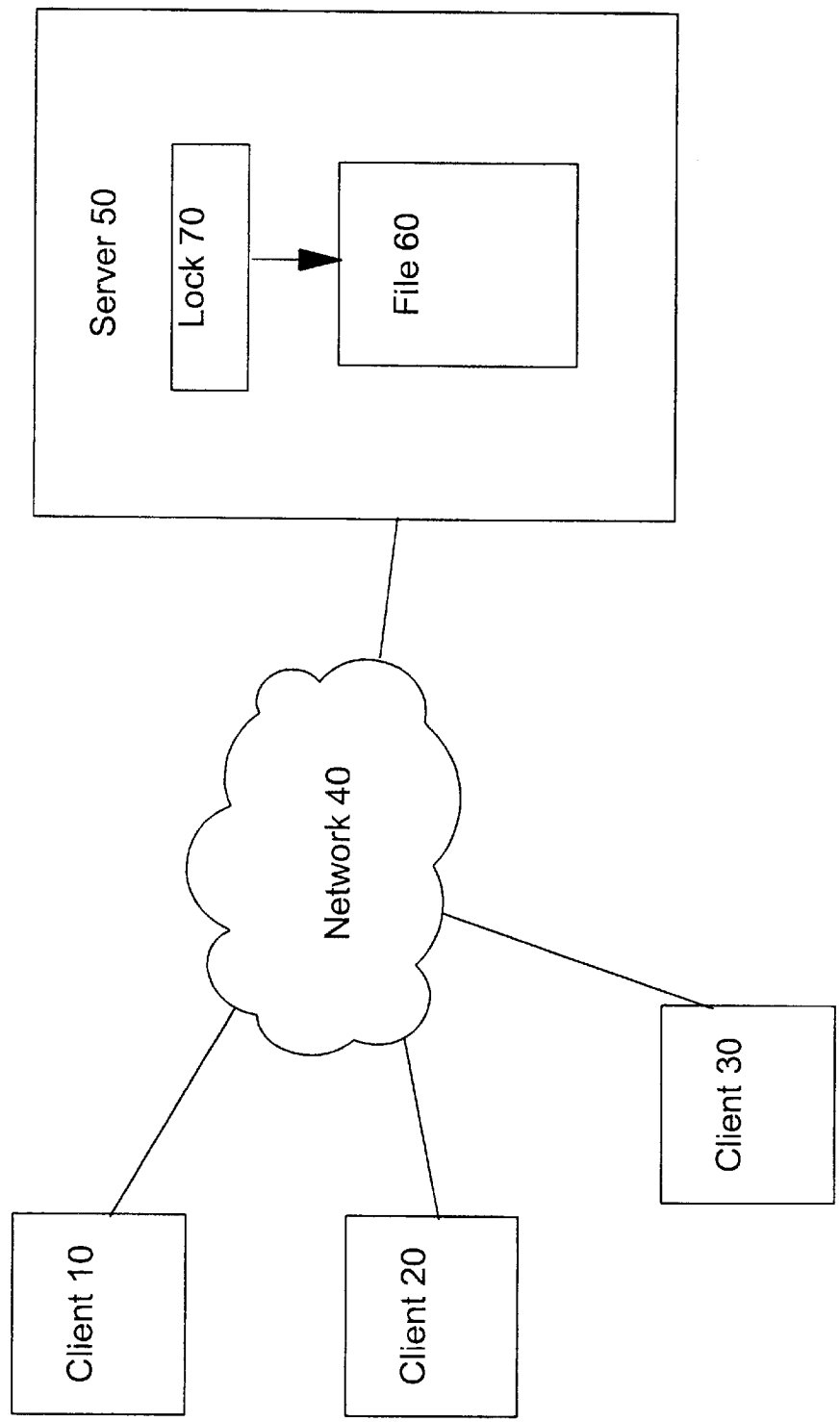
FIG. 1 provides an exemplary diagram of an environment in which a preferred embodiment of the present invention may be implemented.

FIG. 1 provides an exemplary diagram of another environment in which a preferred embodiment of the present invention may be implemented. Clients (10, 20, 30 shown) access a file 60 stored on server 50 over network 40. File 60 may, by way of example, be a word processing document such as a team project plan. In which case, team members will in all likelihood, access the document in order to read the plan and also to make changes to it. In order to co-ordinate access to the document, lock information 70 is associated with document 60. A client is only able to make changes to the document (e.g. via a writing process (not shown)), when no other processes are actively accessing the document for any reason.

According to the preferred embodiment, the present invention provides a method, apparatus and computer program product for allocating shared and exclusive locks on a resource which overcomes the recoverability and performance problems associated with known solutions and described in the background section.

Figure 2:
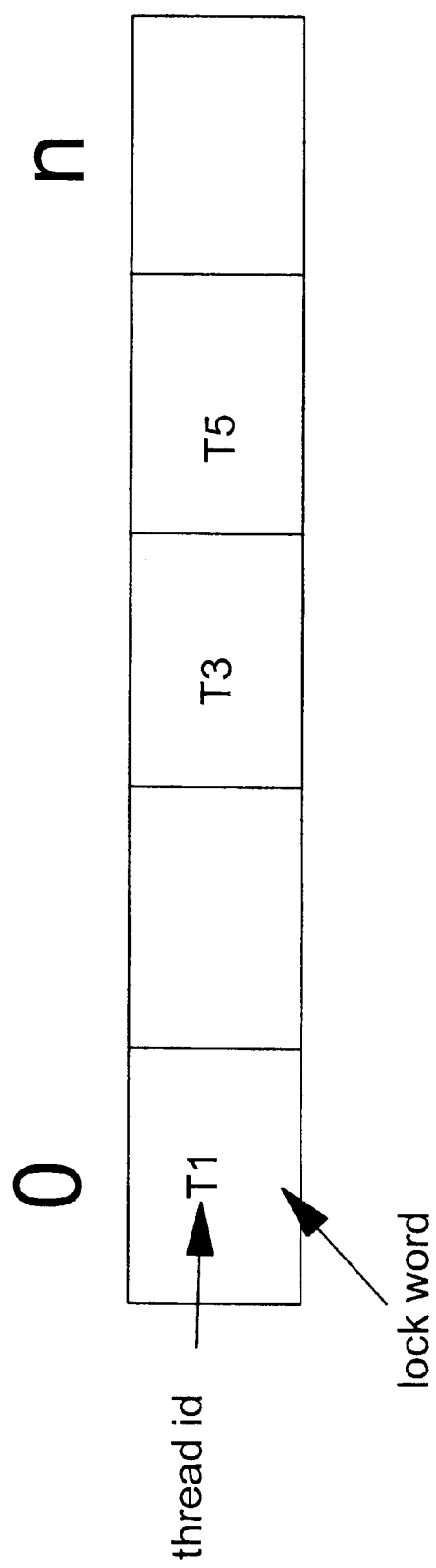
FIG. 2 shows lock information stored in accordance with a preferred embodiment of the present invention.

FIG. 2 shows lock information stored in accordance with a preferred embodiment of the present invention. Lock information is stored as an array[0–n] (storage area) of lock words (storage slots). In order to obtain a shared lock on the resource with which the array is associated, a reader acquires (i.e. locks) any one of the lock words. In order to obtain an exclusive lock on the resource, a process preferably acquires all 0 through to n lock words. In other words, the writing process is the only process accessing the resource at any one time. Note, possession of a lock word is exclusive and may not therefore be shared with any other process. A process can consist of any number of threads and preferably indicates possession of a lock word by inserting a unique thread id (e.g. T1) which is associated with the thread requesting the shared lock or exclusive lock into a lock word. The thread id is preferably unique not only within a process, but across all processes having access to the resource.

Figure 3:
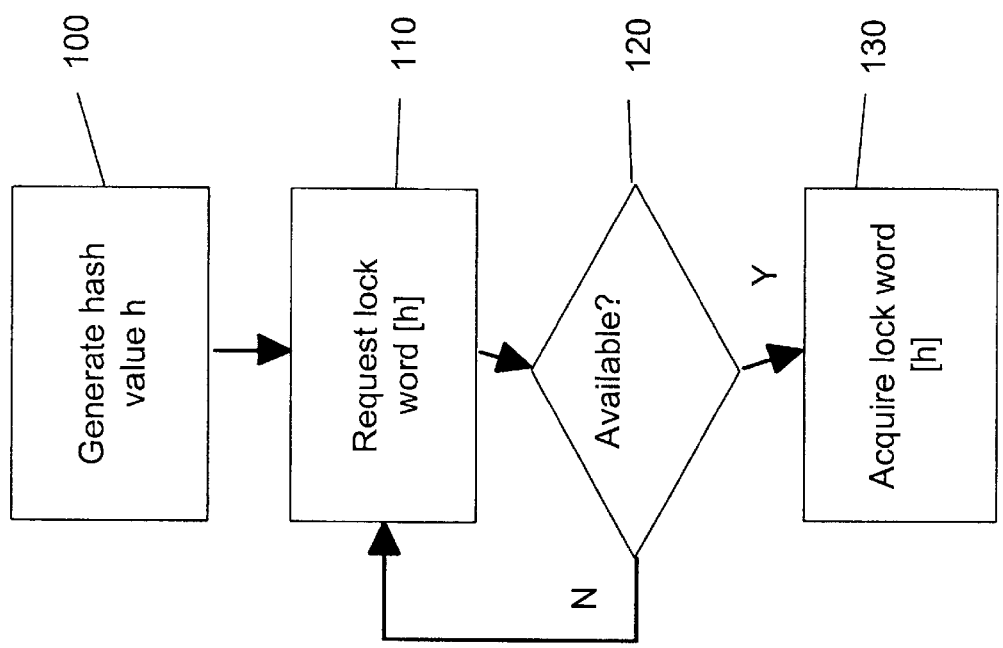
FIG. 3 is a flowchart showing how a shared lock is obtained on a resource in accordance with one embodiment of the present invention.

FIG. 3 is a flowchart showing how a shared lock is obtained on a resource in accordance with one embodiment of the present invention. The reader generates a hash value h in the range 0 to n at step 100. The reader then requests lock word[h] at step 110. At step 120 it is determined whether or not the specified lock word is available and assuming it is, the reader acquires the lock word at step 130. If the lock word is owned by another process, then the reader waits its turn.

Figure 4:
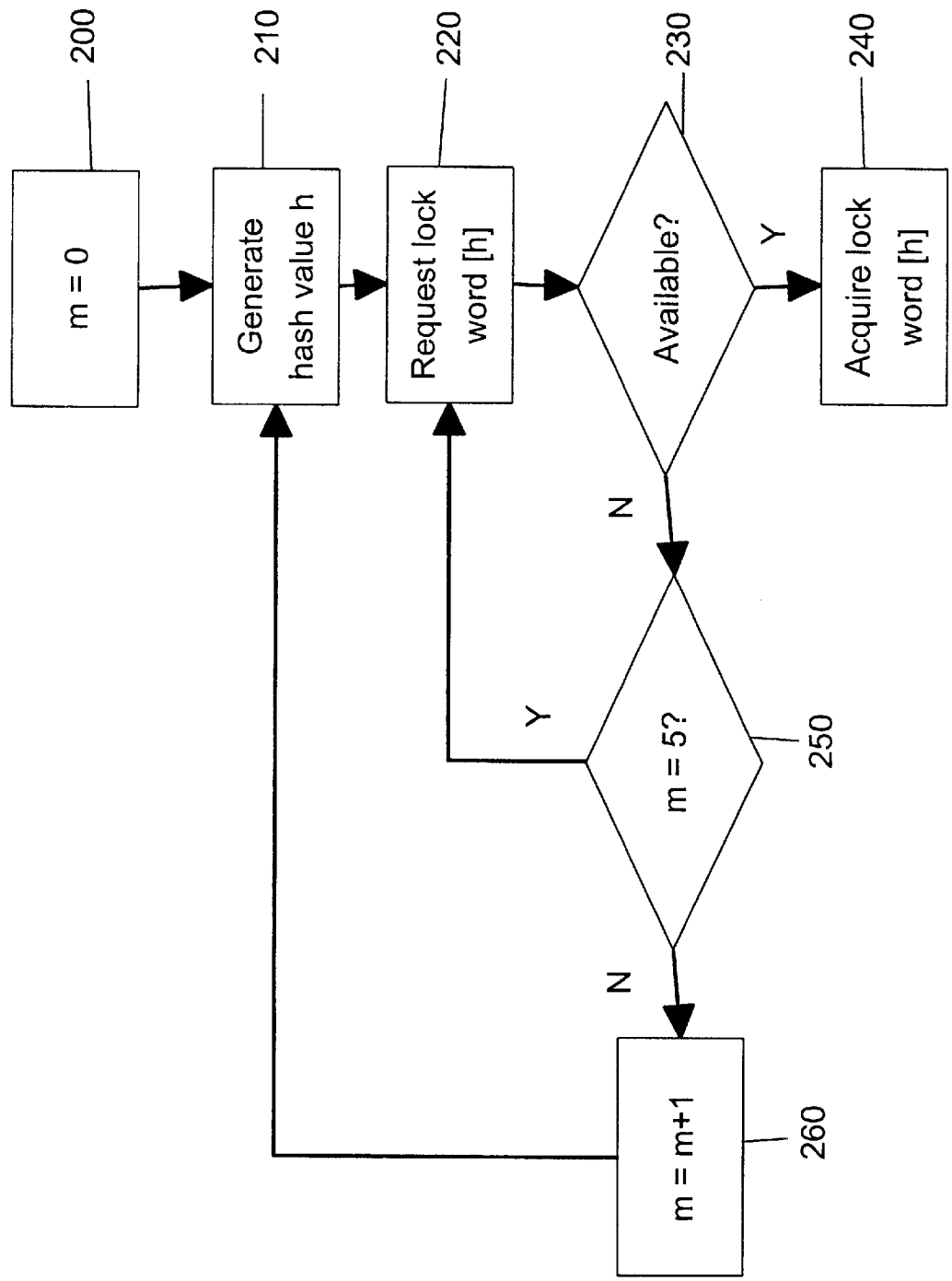
FIG. 4 shows how a high priority shared lock is obtained on a resource in accordance with one embodiment of the present invention.

Thus a hash algorithm is used to determine which lock word a reading process acquires. This algorithm may also take account of the priority of a request. A low priority reader, according to one embodiment, uses the process depicted in FIG. 3. FIG. 4 shows how a high priority shared lock is obtained on a resource in accordance with one embodiment of the present invention. A counter m is initialised to 0 at step 200. A hash value h is generated at step 210 and lock word [h] is then requested (step 220). If the specified lock word is available (step 230) then it is acquired at step 240. Otherwise, the counter m is read (step 250) to determine whether it is greater than a predefined threshold value (e.g. 5). Assuming that it is not, the counter is incremented (step 260) and new hash value is generated at step 210. The reader then tries to obtain the lock word at the position specified by the new hash value. Thus the reader continues to try random lock words until one is found to be available at step 230 or the counter is found to be equal to the predefined threshold value at step 250. In the latter instance, the reader waits on the current lock word for it to become available. The predetermined threshold value is preferably used to ensure that a process doesn't loop indefinitely.

In accordance with another embodiment, low priority readers favour low values in the range 0 to n, whilst high priority readers favour high values in the range 0 to n. (Of course, the opposite may also be true.) Thus in an array containing ten lock words, the first five may be attributed to low priority readers, whilst the last five are attributed to high priority readers. This method of prioritisation ensures that low priority requests are pitted against one another and likewise with the high priority requests. A high priority request should not therefore, be forced to wait on a low priority request. In accordance with one embodiment, if all the lock words attributed to high priority requests are taken but low priority lock words are still available, then a high priority request acquires one of these. Preferably this is not a regular occurrence since it is otherwise likely that low priority requests will have trouble gaining access to the resource.

According to one embodiment, when a reader acquires a lock word it remembers/stores in memory the position of that lock word within the lock array. This means that when the reader wants to relinquish its access, the stored positional information can be used in order to identify the correct lock word so that it can remove its thread id from that lock word and free it up for use by other processes.

Alternatively a similar process to that by which the lock word was initially allocated can be used to release that lock word. In the preferred embodiment a hash value is generated which denotes the lock word that the reader attempts to acquire. Thus in relinquishing access, hash values are generated until the thread id of the reader matches the thread id associated with the selected lock word. Once the match is found, the reader removes its thread id and frees up that lock word for use by other processes.

Further, in one embodiment if low priority requests are known to favour a first part of the lock array and high priority requests a second part, then the priority of the request attempting to relinquish access determines which part of the array the process looks in.

Another option, dependent upon the size of the lock array, is for the reader to pass sequentially through the lock array until a match is discovered.

Note, the above are examples only and the invention is not in anyway limited to these.

Figure 5:
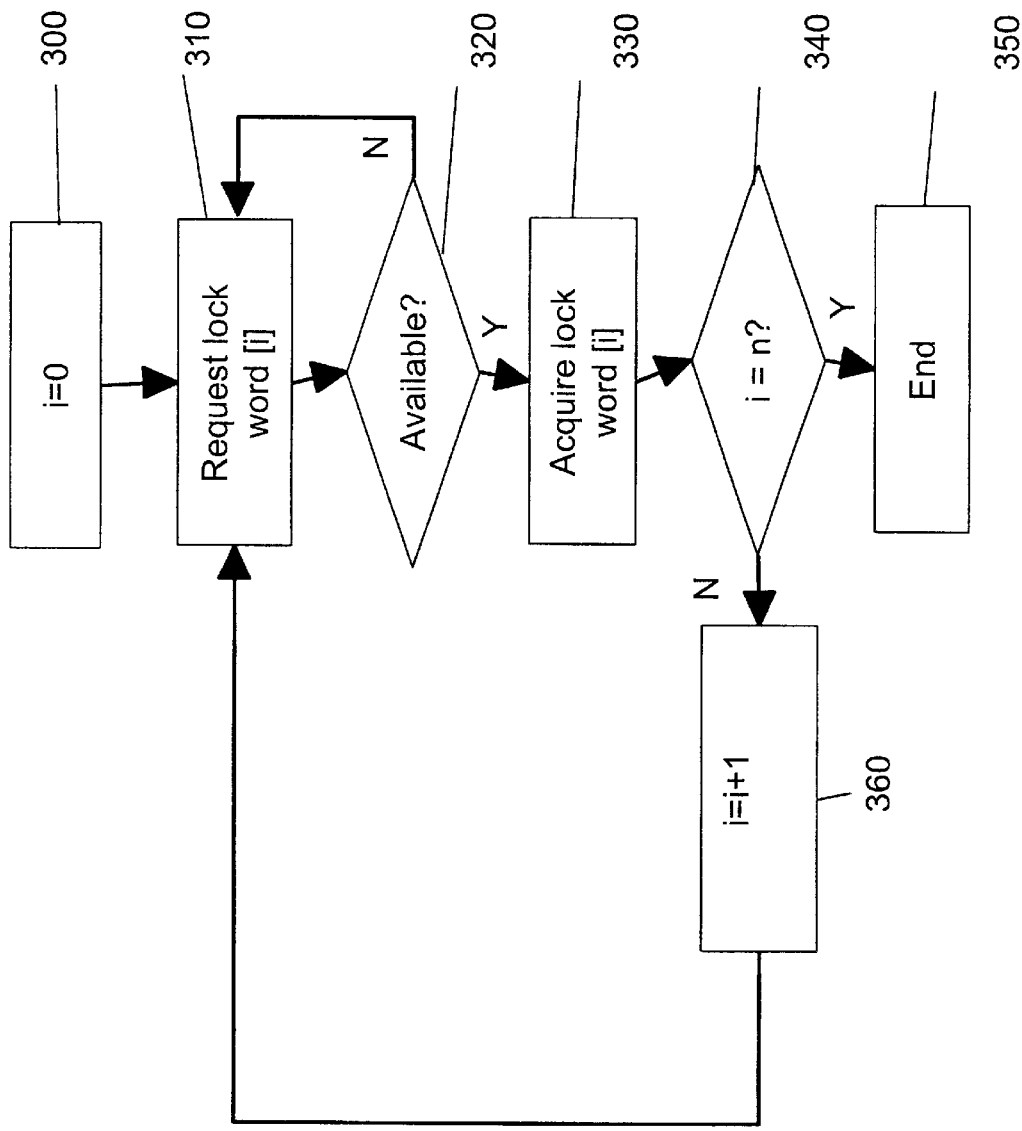
FIG. 5 is a flowchart showing how a low priority writer obtains an exclusive lock on a resource in accordance with one embodiment of the present invention.

FIG. 5 is a flowchart showing how a low priority writer obtains an exclusive lock on a resource in accordance with one embodiment of the present invention. A counter i is initialised to 0 at step 300 and lock word [i] is then requested at step 310. If it is not available (step 320) then the writer continues to request the lock word until it is relinquished by another process. When the lock word is freed, it is acquired at step 330. The counter i is then compared with a value n which denotes the last lock word position. If i is equal to n then the last lockword has been acquired by the writer and thus access to the resource achieved (step 350). Otherwise, the counter i is incremented (step 360) and the next lock word is requested (step 310). By this method, lock words are requested sequentially and the next lock word in the array is not polled for availability until the current lock word has been acquired.

In accordance with one embodiment, a high priority writer takes a slightly different approach. It acquires all available lock words from 0 through to n on a first pass of the array (i.e. the writer does not wait on a lock word that is currently in use). This may be sequentially or otherwise. The writer then makes a second pass of the array in order to acquire any lock words unavailable the first time round. On this occasion, if a particular lock word is still not available then the writer does not move on to the next lock word until it becomes available. Note, the invention is not limited to one pass only before a writer waits on each unavailable lock word to become available. This is by way of example only.

In another embodiment, there is a queue of high priority writers. When a lock word is released/relinquished in the lock array with which that queue is associated, the writer at the head of the queue is informed and can then acquire the released lock word. The writer is only removed from the queue once it has acquired all lock words within the lock array.

The above provide examples only as to the way in which access is granted to the array of lock words and the invention is not limited to such. By way of other examples, in one embodiment, a reader or writer may have to queue on a lock word. In this instance priority may also be taken into account, with a high priority request moving ahead in the queue of a low priority request. This requires careful control to ensure that low priority requests do not wait indefinitely for access. In another embodiment a queued lock word may be passed over in favour of another lock word (e.g. for one either free or at least without an associated queue).

In the preferred embodiment, when a writer no longer requires access to the resource, all lock words are relinquished and the lock array may thenceforth be used by another process(es). This may happen in any order (sequentially or otherwise).

It will be appreciated that the present invention does limit the number of concurrent readers that are permitted to access a resource. The size of the array is preferably determined in accordance with the requirements of the system in which the locking mechanism is implemented. To reuse the example of team members accessing a project plan, it is likely that the whole team will have read access to the plan (i.e. are readers). Only a limited number of people however, will have write access (i.e. are writers). This means that, for the sake of efficiency, the array should preferably be large enough to accommodate the typical number of team members concurrently requiring shared access to resource.

It is beneficial to have an upper limit on the number of concurrent readers since this makes it simple to accurately record information about the process(es) accessing a resource. If a particular lock word has be occupied by a process for an excessively long period, then it is possible to verify that process is still actively accessing the resource using the appropriate thread id. Further storage for the array can be pre-allocated and there is little overhead in managing the array structure.

Whilst FIG. 3 shows the array as storing a thread id only, the invention is not limited to such and may store other data such as priority information. Further it should be appreciated that priority may be graded and is not therefore limited to the binary values high and low.

It should be noted that whilst the terms "reader" and "writer" have been used throughout, this is for ease of explanation only. The term reader denotes a process which does not mind sharing its access to a resource with other processes and the term writer denotes any process which requires exclusive access to a resource. In this way, data integrity can be maintained.

What is claimed is:

1. A method for controlling access by a plurality of concurrently operating processes to a resource, said method comprising the steps of:

allocating an area of storage and defining a predetermined number of storage slots therein;

responsive to a request by one of said processes for shared access to said resource, determining whether to allocate shared access, and if so, allocating said requesting process shared access, said step of allocating shared access comprising:

acquiring one of said storage slots; and wherein said method further comprises:

responsive to a request by one of said processes for exclusive access to said resource, determining whether to allocate exclusive access, and if so allocating said requesting process exclusive access, said step of allocating exclusive access comprising:

acquiring all of said storage slots.

2. The method of claim 1 wherein the step of determining whether to allocate shared access comprises:

checking whether any one of a set of storage slots is unallocated; and said step of allocating shared access comprises:

responsive to one of said set of storage slots being unallocated, acquiring one of the unallocated slots.

3. The method of claim 1, wherein the step of determining whether to allocate shared access comprises:

selecting a storage slot; and determining whether said storage slot is owned by another process; and wherein said step of allocating shared access comprises:

responsive to said storage slot not being owned by another process, acquiring said selected storage slot.

4. The method of claim 1, wherein each process comprises at least one thread having a unique thread id, each process indicating ownership of a storage slot by associating the thread id of the thread requesting access to said resource with said storage slot.

5. The method of claim 1, wherein each process has priority information associated therewith.

6. The method of claim 5, wherein the step of allocating shared access further comprises:
responsive to determining that a first storage slot is owned by another process, performing an action based on the priority of said requesting process.

7. The method of claim 6, wherein in response to the requesting process having a low priority, said action comprises the steps of:
waiting for said first storage slot to be relinquished by said owning process; and
responsive to said first storage slot being relinquished, acquiring said first storage slot.

8. The method of claim 6, wherein in response to the requesting process having a high priority, said action comprises the steps of:
selecting storage slots until an unallocated storage slot is selected; and
responsive to selecting an unallocated storage slot, acquiring said unallocated storage slot.

9. The method of claim 8, wherein no more than a predetermined number of storage slots are selected, said method further comprising the steps of:
responsive to none of said selected storage slots being available, waiting for the last of said selected slots to be relinquished by an owning process; and
responsive to the last of said selected slots being relinquished, acquiring the last of said selected slots.

10. The method of claim 1, wherein an input queue is associated with at least one of said storage slots.

11. The method of claim 10, wherein responsive to determining that processes are queued on a selected storage slot, selecting another storage slot.

12. The method of claim 10, comprising the step of:
ordering queued processes according to priority information associated therewith.

13. The method of claim 12, comprising the step of:
moving a high priority process to the head of a queue.

14. The method of claim 5, wherein a process requesting shared access and having a low priority selects a storage slot from a first part of said storage area.

15. The method of claim 14, wherein a process requesting shared access and having a high priority selects a storage slot from a second part of said storage area.

16. The method of claim 15, further comprising the step of:
responsive to none of said storage slots being available in said second part of the storage area, acquiring an unallocated storage slot in said first part of the storage area.

17. The method of claim 1, wherein the step of determining whether to allocate exclusive access comprises:
selecting each storage slot; and
determining whether each selected storage slot is owned by another process; and
wherein the step of acquiring all of said storage slots comprises:
responsive to a storage slot not being owned by another process, acquiring said storage slot; and
responsive to a selected storage slot being owned by another process, waiting until said storage slot is relinquished; and
responsive to a storage slot being relinquished, acquiring said storage slot.

18. The method of claim 1, wherein the step of acquiring all of said storage slots comprises:
acquiring, on at least one pass of the storage area, each storage slot not owned by another process; and
subsequent to the step of acquiring each unowned storage slot, selecting each remaining slot;
waiting until each remaining slot is relinquished; and
responsive to each remaining slot being relinquished, acquiring said relinquished slot.

19. The method of claim 1, wherein the step of acquiring all of said storage slots comprises:
informing a process requesting exclusive access as each allocated slot is relinquished; and
responsive to an allocated slot being relinquished, acquiring said relinquished slot.

20. The method of claim 1, wherein the step of a process requesting shared access acquiring one of said storage slots comprises the step of:
responsive to acquiring a storage slot, recording the position of said storage slot.

21. The method of claim 20, further comprising the step of:
responsive to said process no longer requiring shared access to the resource, relinquishing the slot denoting said process' shared access, said relinquishing step comprising:
using said recorded position to locate the storage slot to be relinquished.

22. The method of claim 4, comprising the step of:
responsive to said process no longer requiring shared access to the resource, relinquishing the slot denoting said process' shared access, wherein the step of relinquishing the slot denoting said process' shared access comprises:
selecting a storage slot;
determining whether a thread id associated with a thread requesting that said shared access be relinquished matches a thread id associated with the selected storage slot;
responsive to a match, relinquishing said selected storage slot; and
responsive to determining that there is no match, selecting storage slots until a match is achieved.

23. The method of claim 1, comprising the step of responsive to said process no longer requiring shared access to the resource, relinquishing the slot denoting said process' shared access.

24. The method of claim 23, wherein said step of relinquishing the slot denoting said process' shared access comprises:
searching one of a first part and a second part of the storage area for the slot denoting said process, shared access.

25. The method of claim 1, further comprising the step of:
responsive to a process no longer requiring exclusive access to the resource, relinquishing access to all of said storage slots.

26. A computer program product comprising computer program code recorded on a computer readable recording medium, which when executed on a computer, performs the method of claim 1.

27. Apparatus, having a storage, for controlling access by a plurality of concurrently operating processes to a resource, said apparatus comprising:

means for defining a predetermined number of slots within said storage;

means, responsive to a request by one of said processes for shared access to said resource, for determining whether to allocate shared access; and means, responsive to a determination that shared access is to be allocated, for allocating said requesting process shared access, said means for allocating shared access comprising:

means for acquiring one of said storage slots; and wherein said apparatus further comprises:

means, responsive to a request by one of said processes for exclusive access to said resource, for determining whether to allocate exclusive access; and means, responsive to a determination that exclusive access is to be allocated, for allocating said requesting process exclusive access, said means for allocating exclusive access comprising:

means for acquiring all of said storage slots.

28. The apparatus of claim 27 wherein the means for determining whether to allocate shared access comprises:

means for checking whether any one of a set of storage slots is unallocated; and said means for allocating shared access comprises:

means, responsive to one of said set of storage slots being unallocated, for acquiring one of said unallocated slots.

29. The apparatus of claim 27, wherein the means for determining whether to allocate shared access comprises:

means for selecting a storage slot; and means for determining whether said storage slot is owned by another process; and wherein said means for allocating shared access comprises:

means, responsive to said storage slot not being owned by another process, for acquiring said selected storage slot.

30. The apparatus of claim 27, wherein each process comprises at least one thread having a unique thread id, each process indicating ownership of a storage slot by associating the thread id of the thread requesting access to said resource with said storage slot.

31. The apparatus of claim 27, wherein each process has priority information associated therewith.

32. The apparatus of claim 31, wherein the means for allocating shared access further comprises:

means, responsive to determining that a first storage slot is owned by another process, for performing an action based on the priority of said requesting process.

33. The apparatus of claim 32, wherein in response to the requesting process having a low priority, said means for performing an action comprises:

means for waiting for said first storage slot to be relinquished by said owning process; and means, responsive to said first storage slot being relinquished, for acquiring said first storage slot.

34. The apparatus of claim 32, wherein in response to the requesting process having a high priority, said means for performing an action comprises:

means for selecting storage slots until an unallocated storage slot is selected; and means, responsive to selecting an unallocated storage slot, for acquiring said unallocated storage slot.

35. The apparatus of claim 34, wherein no more than a predetermined number of storage slots are selected, said apparatus further comprising:

means, responsive to none of said selected storage slots being available, for waiting for the last of said selected slots to be relinquished by an owning process; and means, responsive to the last of said selected slots being relinquished, for acquiring the last of said selected slots.

36. The apparatus of claim 27, wherein an input queue is associated with at least one of said storage slots.

37. The apparatus of claim 36, comprising means, responsive to determining that processes are queued on a selected storage slot, for selecting another storage slot.

38. The apparatus of claim 36, comprising:

means for ordering said queued processes according to priority information associated therewith.

39. The apparatus of claim 38, comprising:

means for moving a high priority process to the head of a queue.

40. The apparatus of claim 31, wherein a process requesting shared access and having a low priority selects a storage slot from a first part of said storage area.

41. The apparatus of claim 40, wherein a process requesting shared access and having a high priority selects a storage slot from a second part of said storage area.

42. The apparatus of claim 41, further comprising:

means, responsive to none of said storage slots being available in said second part of the storage area, for acquiring an unallocated storage slot in said first part of the storage area.

43. The apparatus of claim 27, wherein the means for determining whether to allocate exclusive access comprises:

means for selecting each storage slot; and means for determining whether each selected storage slot is owned by another process; and wherein the means for acquiring all of said storage slots comprises:

means, responsive to a selected storage slot not being owned by another process, for acquiring said storage slot; and means, responsive to a selected storage slot being owned by another process, for waiting until said storage slot is relinquished; and means, responsive to a storage slot being relinquished, for acquiring said storage slot.

44. The apparatus of claim 27, wherein the means for acquiring all of said storage slots comprises:

means for acquiring, on at least one pass of the storage area, each storage slot not owned by another process; and means, responsive to the acquisition of all unowned storage slots, for selecting each remaining slot;

means for waiting until each remaining slot is relinquished; and means, responsive to each remaining slot being relinquished, for acquiring said relinquished slot.

45. The apparatus of claim 27, wherein the means for acquiring all of said storage slots comprises:

means for informing a process requesting exclusive access as each allocated slot is relinquished; and means, responsive to an allocated slot being relinquished, for acquiring said relinquished slot.

46. The apparatus of claim 27, wherein the means for a process requesting shared access acquiring one of said storage slots comprises:

means, responsive to acquiring a storage slot, for recording the position of said storage slot.

47. The apparatus of claim 46, further comprising:

means, responsive to said process no longer requiring shared access to the resource, for relinquishing the slot denoting said process' shared access, said relinquishing means comprising:

means for using said recorded position to locate the storage slot to be relinquished.

48. The apparatus of claim 30, comprising:

means, responsive to said process no longer requiring shared access to the resource, for relinquishing the slot denoting said process' shared access, wherein the means for relinquishing the slot denoting said process' shared access comprises:

means for selecting a storage slot;

means for determining whether a thread id associated with a thread requesting that said shared access be relinquished matches a thread id associated with the selected storage slot;

means, responsive to a match, for relinquishing said selected storage slot; and means, responsive to determining that there is no match, for selecting storage slots until a match is achieved.

49. The apparatus of claim 27, comprising means, responsive to said process no longer requiring shared access to the resource, relinquishing the slot denoting said process' shared access.

50. The method of claim 49, wherein said means for relinquishing the slot denoting said process' shared access comprises:

means for searching one of a first part and a second part of the storage area for the slot denoting said process' shared access.

51. The apparatus of claim 27, further comprising:

means, responsive to a process no longer requiring exclusive access to the resource, for relinquishing access to all of said storage slots.

* * * * *